(12) United States Patent
Poumarede et al.

(10) Patent No.: US 12,508,917 B2
(45) Date of Patent: Dec. 30, 2025

(54) HYBRID PROPULSION INSTALLATION AND METHOD FOR CONTROLLING SUCH AN INSTALLATION

(71) Applicant: SAFRAN HELICOPTER ENGINES, Bordes (FR)

(72) Inventors: Vincent Poumarede, Moissy-Cramayel (FR); Jean-Philippe Jacques Marin, Moissy-Cramayel (FR)

(73) Assignee: SAFRAN HELICOPTER ENGINES, Bordes (FR)

( * ) Notice: Subject to any disclaimer, the term of this patent is extended or adjusted under 35 U.S.C. 154(b) by 610 days.

(21) Appl. No.: 17/602,096

(22) PCT Filed: Apr. 10, 2020

(86) PCT No.: PCT/FR2020/000110
§ 371 (c)(1),
(2) Date: Oct. 7, 2021

(87) PCT Pub. No.: WO2020/208318
PCT Pub. Date: Oct. 15, 2020

(65) Prior Publication Data
US 2022/0212547 A1   Jul. 7, 2022

(30) Foreign Application Priority Data
Apr. 12, 2019   (FR) ...................... 1903926

(51) Int. Cl.
*B60L 3/04*      (2006.01)
*B60L 50/10*    (2019.01)
(Continued)

(52) U.S. Cl.
CPC ................ *B60L 3/04* (2013.01); *B60L 50/10* (2019.02); *B64D 35/023* (2024.01); *F02C 6/20* (2013.01);
(Continued)

(58) Field of Classification Search
CPC ........ B60L 50/10; B60L 3/04; B60L 2200/10; B60L 2240/441; B60L 1/00–2270/46;
(Continued)

(56) References Cited

U.S. PATENT DOCUMENTS 4,119,861 A * 10/1978 Gocho .................... F01D 19/00
290/51
9,488,054 B2 * 11/2016 Corpron .................... F01D 5/12
(Continued)

FOREIGN PATENT DOCUMENTS

EP    0122445 A2   10/1984
EP    3222510 A1    9/2017
(Continued)

OTHER PUBLICATIONS

International Search Report and Written Opinion received for PCT Patent Application No. PCT/FR2020/000110, mailed on Aug. 2, 2021, 20 pages (9 pages of English Translation and 11 pages of Original Document).

*Primary Examiner* — Mohamed Abdo Algehaim
(74) *Attorney, Agent, or Firm* — WOMBLE BOND DICKINSON (US) LLP (57) ABSTRACT

A hybrid propulsion installation for an aircraft, including an internal combustion engine having at least one combustion chamber; at least one electricity generator; an electrical propulsion system; electromechanical protection mechanism arranged between the or each electricity generator and the electrical propulsion system; wherein the installation also includes: an electronic computer configured to: receive at least one piece of information on a position of the electromechanical protection mechanism; receive at least one piece of information on a speed of rotation of a shaft of
(Continued)

the internal combustion engine; and control the flow of fuel supplying the combustion chamber depending on the information received.

11 Claims, 3 Drawing Sheets

(51) Int. Cl.
    *B64D 27/33*     (2024.01)
    *B64D 35/023*     (2025.01)
    *F02C 6/20*     (2006.01)
    *F02C 9/26*     (2006.01)
    *F02C 9/28*     (2006.01)
    *F02K 5/00*     (2006.01)

(52) U.S. Cl.
    CPC ............... *F02C 9/26* (2013.01); *F02C 9/28* (2013.01); *F02K 5/00* (2013.01); *B64D 27/33* (2024.01)

(58) Field of Classification Search
    CPC ............ B64D 27/24; B64D 27/026; B64D 1/00–2241/00; F02C 9/26; F02C 9/28; F02C 6/206; F02C 1/00–9/58; F02K 5/00; F02K 1/00–99/00; Y02T 10/7072; Y02T 50/60
    USPC .......................................................... 701/22
    See application file for complete search history.

(56) References Cited

U.S. PATENT DOCUMENTS

| | | | |
|---|---|---|---|
| 10,233,768 B1* | 3/2019 | Watts, III | F02C 9/28 |
| 11,128,251 B1* | 9/2021 | Solodovnik | H02P 25/22 |
| 2009/0118074 A1* | 5/2009 | Zettel | B60K 6/365 477/3 |
| 2013/0242450 A1* | 9/2013 | Mills | H01H 71/68 200/290 |
| 2014/0165571 A1* | 6/2014 | Vertenoeuil | F02C 7/232 60/734 |
| 2014/0167516 A1* | 6/2014 | Gataric | H02J 1/12 307/84 |
| 2014/0338352 A1* | 11/2014 | Edwards | F02C 3/113 60/774 |
| 2016/0017816 A1* | 1/2016 | McDonald | F02C 9/26 701/3 |
| 2016/0090918 A1* | 3/2016 | Certain | F02C 3/10 415/16 |
| 2016/0305320 A1* | 10/2016 | Orellana Hurtado | F02C 3/22 |
| 2016/0340051 A1* | 11/2016 | Edwards | B64D 35/02 |
| 2016/0363001 A1* | 12/2016 | Argote | F02C 9/48 |
| 2017/0167391 A1* | 6/2017 | Demelas | F02C 9/30 |
| 2017/0213676 A1* | 7/2017 | Lell | H01H 39/006 |
| 2018/0155040 A1* | 6/2018 | Armstrong | F04D 29/362 |
| 2018/0171874 A1* | 6/2018 | Klonowski | F02N 11/0866 |
| 2018/0251228 A1* | 9/2018 | Sands | F01D 21/003 |
| 2020/0052552 A1* | 2/2020 | Husband | F02C 9/28 |
| 2020/0062413 A1* | 2/2020 | Feddersen | B64D 31/00 |
| 2020/0144843 A1* | 5/2020 | Kaptein | H02J 7/00304 |
| 2020/0165983 A1* | 5/2020 | Chahal | B64D 27/10 |
| 2020/0271061 A1* | 8/2020 | Kopeschka | F02D 45/00 |
| 2020/0331621 A1* | 10/2020 | Gomez | B64D 31/02 |
| 2021/0203255 A1* | 7/2021 | Marzano | H02P 25/064 |
| 2021/0387742 A1* | 12/2021 | Armstrong | H02P 1/04 |
| 2022/0290606 A1* | 9/2022 | Matsumoto | F02C 9/48 |

FOREIGN PATENT DOCUMENTS

| | | |
|---|---|---|
| EP | 3333401 A1 | 6/2018 |
| EP | 3372506 A1 | 9/2018 |

* cited by examiner

HYBRID PROPULSION INSTALLATION AND METHOD FOR CONTROLLING SUCH AN INSTALLATION

TECHNICAL FIELD OF THE INVENTION

The invention relates to the field of control of aeronautical turbine generators intended for the production of on-board electricity on fixed or rotary wing aircraft, and more particularly to hybrid electric aircraft, in which at least part of the propulsion is provided electrically, the electrical energy being able to be supplied by a combination of storage means, of the type batteries, fuel cells or super-capacitors, and turbine generators.

TECHNICAL BACKGROUND

In this type of aircraft, propulsion and/or lift is known to be provided by electric motors that drive propellers, which may be of the ducted or unducted type, fixed or tilting.

In order to provide sufficient autonomy, in addition to the electrical energy storage means used during certain phases of the aircraft's flight, the majority of the electrical energy used during a mission of the aircraft is produced by one or a plurality of turbogenerators.

A turbogenerator is a turbomachine fueled by fuel, for example kerosene, which drives one or more electrical generators.

Thus, there is no direct mechanical link between the turbomachine and the aircraft's propulsion systems. In this case, it is an electrical transmission, as opposed to a conventional mechanical transmission which directly transmits the mechanical power of the turboshaft engine to a rotor of a helicopter or to a propeller of a turboprop engine.

Figure 1:
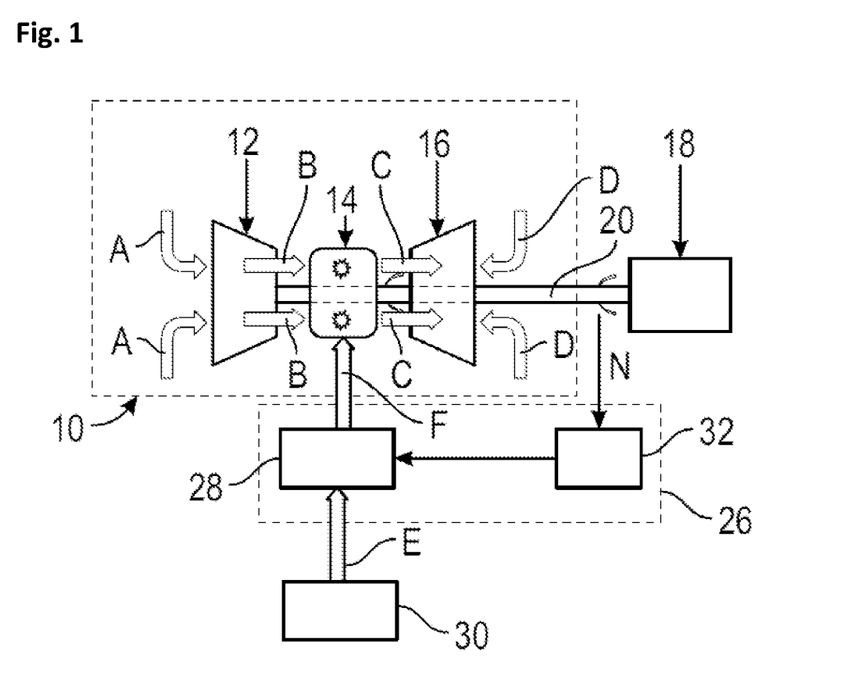
FIG. 1 very schematically represents a linked turbine turboshaft engine according to the prior art, FIG. 2 very schematically represents a free turbine turboshaft engine according to the prior art, FIG. 3 very schematically represents a hybrid electric propulsion system according to the prior art, FIG. 4 very schematically represents a free turbine turboshaft engine with an electronic cut-off system by overspeed detection according to the prior art, FIG. 5 very schematically represents a hybrid electric propulsion installation according to a first embodiment of the invention, FIG. 6 very schematically represents a hybrid electric propulsion installation according to a second embodiment of the invention.
Figure 2:
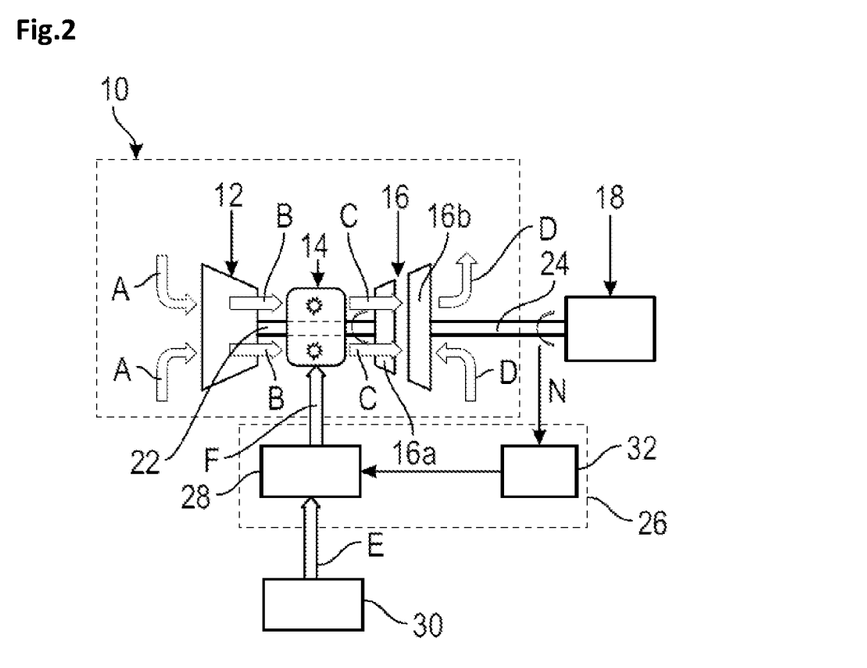

With reference to FIGS. 1 and 2, an aeronautical turbogenerator consists mainly of a subassembly comprising a gas turbine which provides the propulsion of the aircraft or generates non-propulsive auxiliary power, in particular because of its high power to mass ratio. To ensure the propulsion of the aircraft, the gas turbine may be a turboprop engine, a helicopter turboshaft engine, or a turbojet engine. For non-propulsive auxiliary power generation, the gas turbine may be an auxiliary power unit (APU).

A gas turbine 10 consists of a compressor assembly 12 which compresses the surrounding air, represented by the arrows A, a combustion chamber 14 where fuel is mixed with the compressed air, represented by the arrows B, and then burnt, and a turbine assembly 16 which recovers in mechanical form the energy obtained by the expansion of the combustion gases, represented by the arrows C. The gases are then discharged by the turbine assembly 16, in the form of exhaust gases, represented by the arrows D.

This mechanical energy is used to rotate the compressor assembly 12, thereby maintaining the operating cycle.

In addition, this mechanical energy is used to drive the payload 18 of the turbomachine, i.e. a main gearbox and rotors of a helicopter, or a reduction gear, electric motors (referenced 44a, 44n in FIG. 3) driving the propellers of a turboprop engine (referenced 46a, 46n in FIG. 3), and the electric generator(s). The payload 18 may be driven via a mechanical transmission, such as a reduction gear or multiplier, which allows the engine speeds of the turbine assembly 16 and the payload 18 to be matched.

In FIG. 1, a single-shaft turbomachine, referred to as a linked turbine, is shown. The compressor assembly 12, the turbine assembly 16 and the mechanical load 18 are integral with the same shaft 20, and therefore rotate at the same speed.

In FIG. 2, a twin-shaft turbomachine, referred to as a free turbine, is shown. The turbomachine 10 comprises two independent shafts 22, 24, which rotate at different rotational speeds. A first shaft 22 is integral with the compressor assembly 12 and a first turbine assembly 16a, referred to as the gas generating turbine. A second shaft 24 allows a second turbine assembly 16b, referred to as the free turbine, to drive the payload 18, also referred to as the mechanical load.

Due to the presence of two shafts, the free turbine turbomachines are mechanically more complex than linked turbine. However, the possibility of varying the speed of their compressor independently of the speed of the mechanical load makes them capable of being controlled more efficiently, especially in terms of specific consumption, throughout the flight envelope.

In the remainder of the description, the term "power turbine" refers to the linked turbine and free turbine 16a, 16b turbine assemblies 16 that drive the mechanical load 18.

An aeronautical turbogenerator also comprises a subassembly comprising one or a plurality of electrical machines operating as generators, which constitute the mechanical load of the turbomachine.

These electrical machines each consist of a rotor (referenced 48 in FIG. 3) carrying a magnetic field, which is driven in rotation by the turbine assembly 16 of the turbomachine 10, possibly via a mechanical transmission (referenced 40 in FIG. 3) to one or more output power take-offs, as well as a stator (referenced 50 in FIG. 3) formed by fixed polyphase electrical conductors, noted n phases, wound around the rotor on a magnetic yoke.

The rotating magnetic field resulting from the rotation of the rotor creates at the terminals of the stator windings (i.e. the windings of the stator), by the variation of the magnetic flux through the surface of these windings, an alternating voltage, called the electromotive force, whose frequency and amplitude are proportional to the driving speed.

The phases of the generators are then electrically connected to a propulsive electrical network of the aircraft, to which they provide electrical power.

An aeronautical turbogenerator also comprises a subassembly comprising a regulation system 26 which is configured to control the power delivered by the turbomachine 10, monitor its operation, and interface with the aircraft's control systems. The regulation system 26 consists primarily of a fuel system 28 configured to pump fuel into a tank 30 of the aircraft, with fuel pumping represented by the arrow E, and to inject it into the combustion chamber 14, fuel injection represented by the arrow F, and an electronic computer 32, also referred to as an EECU (Engine Electronic Control Unit).

The main function of the computer 32 is to control the speed of rotation N of the mechanical load 18 of the turboshaft engine, i.e. of the generator(s), and to set it to a reference value corresponding to their optimum operating speed.

For this purpose, the computer 32 measures the speed of rotation N of the shaft 20, 24 of the power turbine 16, 16b, compares this acquisition with the set speed, and consequently elaborates a fuel flow setpoint. This setpoint is used to control an electromechanical actuator, called a metering device, which is configured to accurately meter the fuel injected into the combustion chamber 14.

A decrease in the measured speed below the setpoint means an increase in the power demanded by the electrical propulsion system, and therefore in the resistive torque imposed on the shaft 20, 24 by the generator(s). This results in an increase in the amount of fuel injected. Similarly, if the measured speed is increased above its setpoint, there is a decrease in the amount of fuel injected.

However, a failure or defect in one of its components can result in an electrical short circuit, the potential consequences of which are all the more serious as the high propulsive power of a hybrid electric aircraft requires the use of high voltage electrical systems.

It is also imperative to limit the propagation of failures, in order to limit the redundancies to be integrated in the architecture of the electric propulsion chain.

Figure 3:
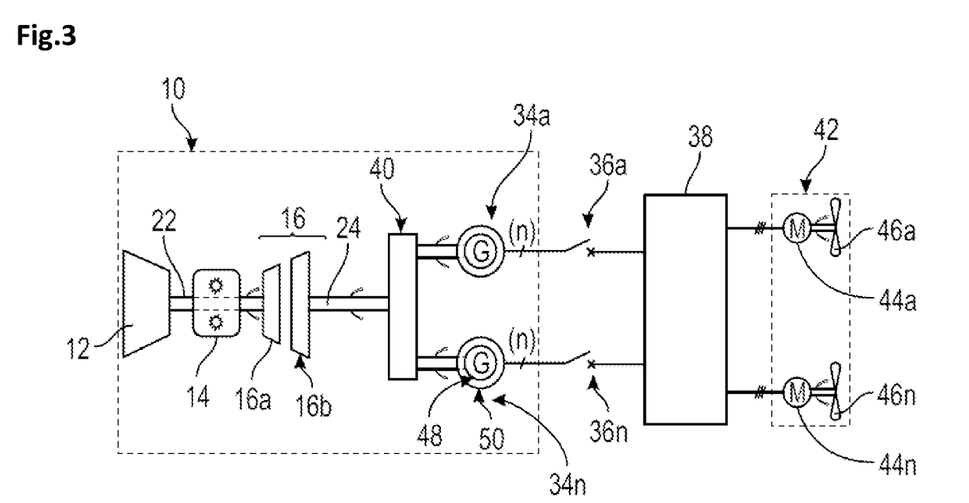

For this reason, as shown in FIG. 3, the connection of the electrical generators 34a, 34n to the electrical propulsion system 38 supplying the electrical thrusters 42 is generally made via an electromechanical protection apparatus, such as a circuit breaker 36a, 36n or contactor, with a high cut-off capacity. In FIG. 3, two generators 34a, 34n are shown, but there could be one or a different number of generators.

The role of the circuit breakers 36a, 36n is to protect the generators 34a, 34n from the consequences of an overcurrent resulting from a downstream short circuit, which could damage them. A downstream short circuit refers to a short circuit occurring in the part of the installation from the circuit breakers (or more generally, the electromechanical protection means) to the electrical propulsion system. A circuit breaker 36a, 36n physically and rapidly opens the electrical circuits of the different phases of the generators 34a, 34n, so as to isolate them from the aircraft electrical network.

The opening of a circuit breaker 36a, 36n results in an almost instantaneous cancellation, more precisely in a few milliseconds, of the electrical power supplied by the associated generator 34a, 34n, and therefore of the resistive torque imposed on the power turbine 16.

The resulting rapid increase in the speed N of the shaft 20, 24 is partially counteracted by the computer 32, which commands a reduction in the fuel flow.

However, given the delay of the closed control loop responsible for calculating the flow rate setpoint, whose performance is necessarily limited by stability criteria, in particular in the absence of a derivative corrector, and the dynamics of the fuel system, the reduction in flow rate may sometimes be too slow to avoid overspeeding the power turbine 16.

The overspeed of the power turbine 16 must be avoided or at least limited in magnitude, as it imposes abnormally high mechanical stresses, such as centrifugal forces, on rotating components, in particular on the turbines and the rotors of the generator, which can result in damage to these components, or in extreme cases, in their bursting.

The turbogenerators are more vulnerable to this overspeed phenomenon than conventional turboshaft engines or turboprop engines, as the latter benefit from the high inertia of the driven mechanical load.

Moreover, the mechanical transmission failures, which are the only damage that can cause an almost instantaneous cancellation of the load torque of the power turbine 16, are extremely rare.

On the contrary, the inertia of the electric machine(s) driven by a turbine generator is lower, which accentuates the magnitude of the overspeed. This is, in particular, true when the generators 34a, 34n are high-speed driven electric machines, such as permanent magnet generators.

In addition, the free turbine turbomachines are also more sensitive to the overspeed than those with linked turbines, as the high inertia of the compressor assembly 12 is added to the inertia of the power turbine 16 and the driven mechanical load 18.

The fact of mechanically over-dimensioning the rotating assemblies of the turbogenerator, i.e., the turbines and the rotors of the generators, in order to make them tolerant to overspeed, generally leads to a mass penalty such that the system is no longer airworthy.

It is therefore desirable to integrate into the regulation system a function that limits overspeeds resulting from a circuit breaker opening and an almost instantaneous loss of the generated electrical power.

It is known that control computers for turbine generators incorporate an electronic cut-off function by detecting overspeed.

Figure 4:
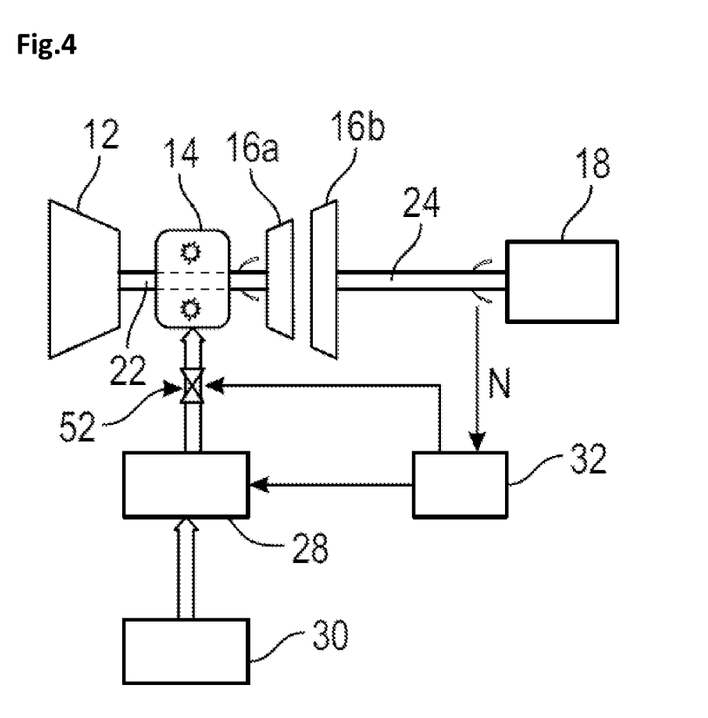

Such a system is shown in FIG. 4, and in particular it has all the features shown in FIG. 2.

When the speed N of the shaft 24 of the power turbine 16b exceeds a certain detection threshold, the computer 32 commands the closing of a solenoid valve 52 which rapidly cuts off the fuel supply to the turbomachine which is extinguished almost instantaneously, thus effectively limiting the magnitude of the overspeed.

However, in this system, all generators driven by the turbogenerator cease to be driven simultaneously. This can affect the supply of electrical power to circuits other than the one affected by the short circuit that caused the circuit breaker to open.

This may result in the loss of a significant proportion of the propulsive power of the hybrid electric aircraft, and therefore the implementation of a specific and demanding emergency procedure for the aircraft.

This may also cause penalizing constraints on the design of the aircraft's propulsion architecture, for example by providing redundant backup power supply systems.

Furthermore, the difference between the overspeed detection threshold coded in the computer 32 and the maximum overspeed value which must never be exceeded by the rotors concerned, i.e., the rotors of the power turbine 16 and the driven mechanical load 18, for reasons of mechanical strength, is substantially inversely proportional to the inertia of these rotors.

A low inertia requires a relatively low overspeed cut-off threshold to be selected, which may interfere with the transient overspeed achieved by the power turbine 16 during a normal operating transient, such as a rapid decrease in the propulsive power demand required by the flight control system.

This may result in a compromise between the aircraft flight performance and the weight of the turbine generator.

It is also known to use an anticipator, which is a device that transmits to the computer 32 a piece of information representative of the instantaneous power required by the propulsion system from the turbogenerator.

On a helicopter turboshaft engine, the anticipator consists of a re-reading of the position of the collective pitch of the main rotor, which, combined with the measurement of the speed of this rotor and that of the density of the air, enables to reconstitute, with high dynamics, an accurate estimate of the instantaneous power that the power turbine 16 must provide to the propulsion system.

In a turboprop engine, a similar principle applies, but from the measurement of the propeller pitch.

This power information is used in the fuel flow control loops coded in the computer 32 to perform open-loop pre-adjustment of the fuel flow setpoint, so as to improve dynamic performance and limit going beyond setpoints.

On a multi-rotor electric hybrid aircraft, anticipation is more complex to achieve as it may depend on a large number of factors, such as individual measurements or estimates of the speed, pitch and/or mechanical torque of each engine, propeller or rotor. This calculation may be performed directly by the computer 32, or it may be performed by an aircraft computer and then transmitted to the computer 32 in a synthetic form.

However, the incompressible time required to process this pieces of information and the delay linked to the transmission of the anticipation by a digital data link limit the performance gain linked to its use.

Furthermore, given the rapid reconfiguration of the propulsion system in the event of a fault, and, in particular, of the various sources of electrical power supply, the anticipator may not succeed in communicating to the computer 32 sufficiently quickly the information on the very rapid shedding of the power supplied by the turbogenerator following the opening of the circuit breaker of a generator.

The purpose of the invention is to propose a solution to remedy at least some of these drawbacks.

In particular, the present invention proposes an alternative means for anticipating the loss of resistive torque following the opening of a circuit breaker, which is both reliable and fast.

SUMMARY OF THE INVENTION

To this end, the invention relates to a hybrid propulsion installation for an aircraft, comprising:
- an internal combustion engine comprising at least one combustion chamber;
- at least one electricity generator coupled to the internal combustion engine such that in operation the internal combustion engine drives said or each electricity generator;
- an electrical propulsion system coupled to said or each electricity generator so that in operation said or each electricity generator drives the electrical propulsion system;
- electromechanical protection means arranged between said or each electricity generator and the electrical propulsion system, each electromechanical protection means being able to be in a so-called closed position in which an electrical current is transmitted from the electricity generator to the electrical propulsion system or in a so-called open position in which the transmission of the electrical current from the electricity generator to the electrical propulsion system is interrupted;
- characterised in that the installation also comprises:
- an electronic computer configured to:
  - receive at least one piece of information on the position of the electromechanical protection means;
  - receive at least one piece of information on a speed of rotation of a shaft of the internal combustion engine; and
  - control the flow of fuel supplying the combustion chamber based on said received pieces of information.

According to the invention, the internal combustion engine may be a turbomachine, which comprises a gas turbine; and the electromechanical protection means may comprise circuit breakers.

Advantageously, the installation according to the invention enables to anticipate the drop in load following the unloading of an electricity generator, i.e. following the momentary suppression of the electric current from the electricity generator, by a rapid reduction in the flow of fuel metered, and thus to reduce the magnitude of the overspeed of the gas turbine of the turbomachine.

A reduction in the magnitude of the overspeed following the opening of the circuit breakers advantageously enables to avoid an overspeed cut-off, and therefore to maintain a functional turbomachine, but also to limit the level of stress taken into account in the mechanical design of the generators and the turbine.

In fact, according to the invention, the piece of information on the position of the electromechanical protection means is discrete information linked to the electrical load shedding of the generators driven by the turbomachine, which is taken into account in order to anticipate the drop in load.

Each electromechanical protection means may comprise at least one auxiliary contact for copying the position of the main cut-off poles of said electromechanical protection means.

In this case, the electronic computer is configured to receive at least one piece of information on the position of said auxiliary contact(s).

The installation according to the invention may also comprise a device configured to receive at least a first piece of information on the position of the electromechanical protection means and to transmit it to the electronic computer.

Such a device, commonly referred to as avionics, may be integrated into the aircraft, for example in the cockpit, and may comprise navigation, piloting and flight information systems.

The device may also be configured to generate, from the first piece of information, a second piece of information on the position of the electromechanical protection means and to transmit said second piece of information to the electronic computer.

The installation according to the invention may also comprise a solenoid valve arranged between a fuel circuit and the combustion chamber.

The solenoid valve may be in a so-called open position in which the combustion chamber is supplied with fuel or in a so-called closed position in which the supply of fuel to the combustion chamber is interrupted.

In this case, the electronic computer is also configured to control the opening and closing of the solenoid valve.

The invention also relates to an aircraft comprising at least one hybrid propulsion installation according to the invention.

The invention also relates to a method of controlling the hybrid propulsion installation according to the invention, comprising the steps of:
- receiving, by the electronic computer, at least one piece of information on the position of the electromechanical protection means;
- receiving, by the electronic computer, at least one piece of information on a speed of rotation of a shaft of the internal combustion engine; and
- controlling, by the electronic computer, the flow of fuel supplying the combustion chamber according to said pieces of information received.

The control step may consist in reducing the electric power setpoint of the internal combustion engine when a piece of information on the position of the electromechanical protection means indicates an open position of at least one of the electromechanical protection means.

The reduction of the electric power setpoint, for all the electric generators, can be calculated according to the formula:

$$P = \frac{P_{ant}}{N} \qquad \text{[Math 1]}$$

where P is the electric power setpoint of the internal combustion engine, $P_{ant}$ is the anticipatory power of the electrical generators and of the electrical propulsion system before receiving a piece of information on the position of the electromechanical protection means indicating an open position of at least one of the electromechanical protection means, and N is the number of electrical generators of the hybrid propulsion installation.

The reduction of the electrical power setpoint, for each electricity generator, can be calculated according to the formula:

$$P = P\_gen_i \qquad \text{[Math 2]}$$

where P is the electrical power setpoint of the internal combustion engine, $P\_gen_i$ is the anticipatory power of the electricity generator i and of at least one part of the electrical propulsion system driven by the electricity generator i, where i is between 1 and N, where N is the number of electrical generators in the hybrid propulsion installation.

BRIEF DESCRIPTION OF THE FIGURES

The present invention will be better understood and further details, features and advantages of the present invention will become clearer from the following non-limiting example description, with reference to the attached drawings in which.

The elements having the same functions in the different implementations have the same references in the figures.

DETAILED DESCRIPTION OF THE INVENTION

Figure 5:
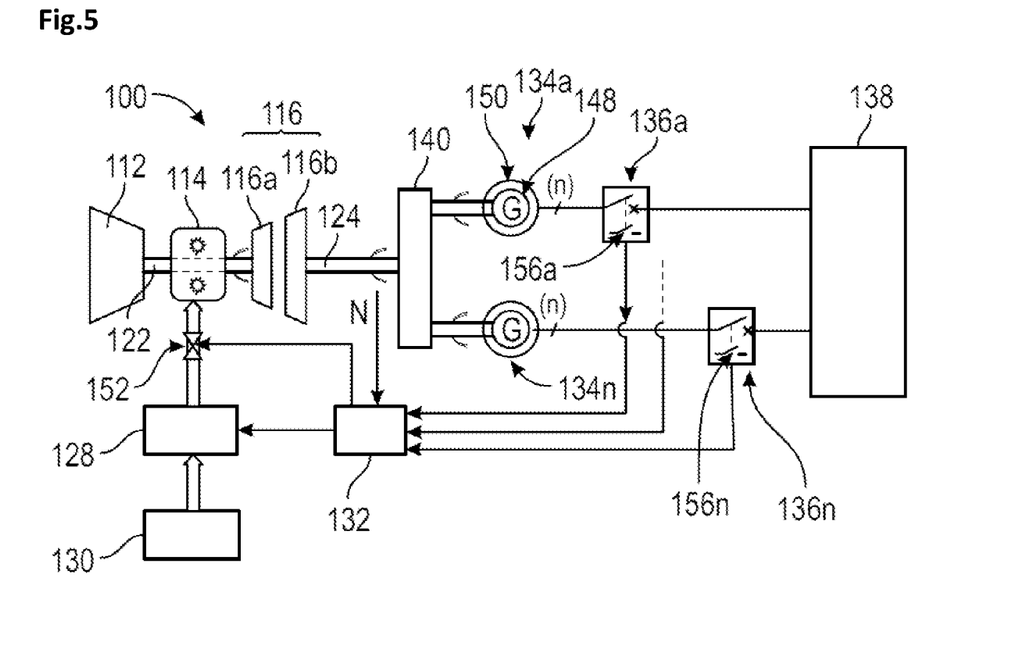
Figure 6:
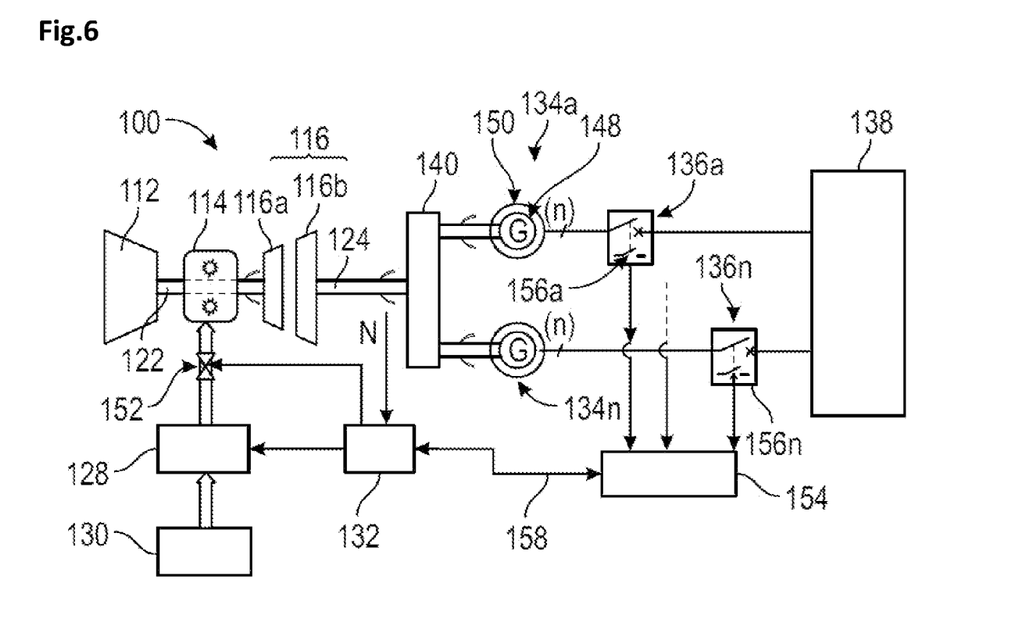

FIGS. 5 and 6 show hybrid electric propulsion installations according to the invention.

The installation 100 consists of an internal combustion engine, such as a turbomachine, which comprises a compressor assembly 112 which compresses the surrounding air, a combustion chamber 114 where the fuel is mixed with the compressed air and then burned, and a turbine assembly 116 which recovers in mechanical form the energy obtained by the expansion of the combustion gases.

The mechanical energy may be used to rotate the compressor assembly 112 to maintain the operating cycle and to drive the payload of the turbomachine.

The payload may be driven through a mechanical transmission, such as a reduction gear or multiplier, so as to match the engine speeds of the turbine assembly 116 and the payload.

In FIGS. 5 and 6, the turbomachine is free turbine, and comprises two independent shafts 122, 124, which rotate at different speeds. The shaft 122 is integral with the compressor assembly 112 and a first turbine assembly 116a, and the shaft 124 connects a second turbine assembly 116b to the payload of the turbomachine. The shafts 122, 124 may be concentric.

Although not shown, the turbomachine may be linked turbine, with a single-shaft connecting the compressor assembly, the turbine assembly and mechanical load.

The turbomachine also includes at least one electrical machine operating as a generator 134a, 134n, which forms the mechanical load of the turbomachine. Each generator 134a, 134n is coupled to the electric internal combustion engine so that in operation the internal combustion engine drives the generators 134a, 134n.

An electricity generator comprises a rotor 148, which is driven in rotation by the turbine assembly 116b, for example via a mechanical transmission 140, and a stator 150.

In FIGS. 5 and 6, two generators 134a, 134n are shown, but there could be one or a different number of generators.

The electrical generators are electrically connected to the aircraft's electrical propulsion system 138. In operation, each generator 134a, 134n supplies power to the electrical propulsion system 138.

The electrical propulsion system 138 may comprise means for converting direct current to alternating current, electric motors connected to the converting means so that in operation the converting means supply alternating current to the electric motors, and propellers coupled to the electric motors so that in operation the electric motors drive the propellers.

The installation 100 also comprises a regulation system which is configured to control the power delivered by the turbomachine, monitor its operation, and make the interface with the aircraft's control systems.

The regulation system comprises a fuel device 128 configured to pump fuel into a tank 130 of the aircraft. In FIGS. 5 and 6, the pumping of the fuel is represented by the arrow E.

The fuel device 128 is also configured to inject fuel into the combustion chamber 114. In FIGS. 5 and 6, the injection of the fuel is represented by the arrow F.

The generators 134a, 134n are connected to the electrical propulsion system 138 via electromechanical protection means, such as circuit breakers 136a, 136n or power contactors. In the case of a circuit breaker, the two states open and closed are stable states and the cut-off capacity is generally greater (compared to a power contactor). In the following, particular reference is made to circuit breakers, but all that is explained applies similarly to power contactors.

The circuit breakers 136a, 136n are configured to protect the generators 134a, 134n from the consequences of an overcurrent following a downstream short circuit, i.e. in the part of the installation from the circuit breakers (or more generally, the electromechanical protection means) to the electrical propulsion system. The circuit breakers 136a, 136n are configured to open, in a rapid manner, the electrical circuits of the various phases of the generators 134a, 134n so as to isolate them from the aircraft electrical network.

In particular, each circuit breaker 136a, 136n may be in a so-called closed position in which an electrical current is transmitted from the electricity generator 134a, 134n to the electrical propulsion system 138 or in a so-called open position in which the transmission of the electrical current from the electricity generator 134a, 134n to the electrical propulsion system 138 is interrupted.

In the event of a major fault such as a short circuit in the electrical propulsion system 138 causing one or more circuit breakers 136a, 136n to open, the electrical power supplied by the windings of the corresponding generators 134a, 134n is abruptly cancelled, with the result that the resistive torque exerted on the power turbine rapidly decreases, and thus an overspeed of the power turbine is observed.

A reduction in the flow of fuel supplying the combustion chamber 114 of the turbomachine is used to overcome an overspeed of the power turbine.

The purpose of the present invention is to anticipate the drop in load following the shedding of a generator 134a, 134n by a rapid reduction in the flow of fuel metered, and thus to reduce the amplitude of the overspeed.

To this end, the installation 100 comprises an electronic computer 132 which is configured to receive pieces of information on the positions of the electromechanical protection means.

More precisely, the computer 132 takes into account pieces of information of a mechanical nature directly related to the open or closed positions of the circuit breakers 136a, 136n.

The electronic computer 132 is also configured to receive pieces of information on the speed of rotation N of the shaft 124 of the power turbine 116b. In particular, the electronic computer 132 may be configured to measure the speed of rotation N of the shaft 124 of the power turbine 116b.

The electronic computer 132 is also configured to control the flow of fuel supplying the combustion chamber 114 based on the pieces of information received, i.e. from the pieces of information on the position of the circuit breakers 136a, 136n and the pieces of information on the speed of rotation N of the shaft 24 of the power turbine 116b.

In particular, the computer 132 is configured to compare this received pieces of information with a setpoint for the speed of rotation of the gas turbine, and to generate a fuel flow setpoint accordingly.

This setpoint may be used to control an electromechanical actuator that is configured to accurately meter the fuel injected into the combustion chamber 114.

Thus, the computer 132 is configured to control an increase or decrease in fuel flow.

In particular, each circuit breaker 136a, 136n may include at least one auxiliary contact 156a, 156n for copying the position of the main cut-off poles of the circuit breaker 136a, 136n. In other words, each circuit breaker 136a, 136n may incorporate an auxiliary contact 156a, 156n for copying the position of the main cut-off poles, the position of which is, by construction, mechanically linked to that of the main cut-off poles.

The computer 132 is then configured to receive pieces of information on the positions of these auxiliary contacts 156a, 156n.

The pieces of information, of discrete type, that these auxiliary contacts 156a, 156n provide is intrinsically very reliable, and without any time lag with the opening of the main poles of the circuit breakers 136a, 136n, other than the acquisition time by the computer 132.

As shown in FIG. 5, these auxiliary contacts 156a, 156n can be directly wired to discrete inputs of the computer 132, and their acquisition is directly integrated as a parameter in the feedforward law implemented by the computer 132 to control the flow of fuel injected into the combustion chamber 114.

As shown in FIG. 6, the installation comprises an avionics 154, which corresponds to all the electronic, electrical and computer equipment that helps to pilot the aircraft. The avionics 154 is configured to receive pieces of information on the positions of the circuit breakers 136a, 136n and to transmit it to the computer 132. In other words, the acquisition of the positions of the circuit breakers 136a, 136n may be performed in the avionics 154, and the data may be transmitted by the avionics 154 to the computer 132, in particular via a digital bus 158.

The avionics 154 may also be configured to synthesise the pieces of information about the positions of the circuit breakers 136a, 136n and to transmit the synthesised pieces of information to the computer 132. In other words, the pieces of information may be transmitted in synthetic form from the avionics 154 to the computer 132.

The installation 100 may comprise a solenoid valve 152 arranged between the fuel system 130 and the combustion chamber 114.

The solenoid valve 152 may be in a so-called open position in which the combustion chamber 114 is supplied with fuel or in a so-called closed position in which the supply of fuel to the combustion chamber 114 is interrupted.

The computer 132 may incorporate an electronic cut-off function by overspeed detection. In particular, the computer 132 may be configured to command the closing of the solenoid valve 152 when the speed of rotation N of the shaft 124 exceeds a certain detection threshold. The solenoid valve 152 is thus configured to cut off the fuel supply to the turbomachine.

The invention also relates to a method of controlling the installation 100 described above.

The method comprises a step of receiving, by the computer 132, pieces of information on the positions of the circuit breakers 136a, 136n.

The method also comprises a step of receiving, by the computer 132, pieces of information on the speed of rotation N of the shaft 124 of the power turbine. In other words, the positions of the auxiliary contacts 156a, 156n corresponding to the circuit breakers 136a, 136n of the various generators 134a, 134n driven by the turbomachine are acquired by the computer 132.

In addition, the method comprises a step of control, by the computer 132, of the fuel flow rate feeding the combustion chamber 114 according to the pieces of information received.

The control step consists of a reduction of the electrical power setpoint of the turbomachine when a piece of information on the position of the circuit breakers 136a, 136n indicates an open position of at least one of the circuit breakers 136a, 136n.

During operation of the turbomachine, when the opening of a circuit breaker 136a, 136n is detected, the pre-calculated electrical power setpoint of the turbomachine is reduced immediately.

The reduction in the electrical power setpoint, for all generators 134a, 134n, can be calculated according to the formula:

$$P = \frac{P_{ant}}{N} \quad \text{[Math 3]}$$

where P is the electrical power setpoint of the turbomachine, $P_{ant}$ is the anticipatory power of the generators 134a, 134n and of the electrical propulsion system 138 before receiving the piece of information on the position of the circuit breakers 136a, 136n indicating an open position of at least one of the circuit breakers 136a, 136n, and N is the number of electrical generators of the hybrid propulsion installation initially in operation. $P_{ant}$ is thus the anticipatory power of the entire propulsion chain fed by the turbomachine before taking into account the loss of a generator 134a, 134n.

According to this formula, the anticipation is calculated globally, i.e. it is considered that each generator 134a, 134n provides the same contribution.

The reduction of the electrical power setpoint, for each generator 134a, 134n, can be calculated according to the formula:

$$P = P\_gen_i \quad \text{[Math 4]}$$

with P the electrical power setpoint of the turbomachine, $P\_gen_i$ the anticipatory power of generator i and of at least one part of the electrical propulsion system 138 driven by generator i, where i is between 1 and N, where N is the number of electrical generators in the installation 100. $P\_gen_i$ is thus the anticipation power specific to the electric propulsion power supplied by generator i.

According to this formula, the anticipation is calculated separately for each generator 134a, 134n.

The invention claimed is:

1. A hybrid propulsion installation for an aircraft, comprising:
   an internal combustion engine comprising at least one combustion chamber;
   at least one electricity generator coupled to the internal combustion engine such that in operation the internal combustion engine drives said at least one electricity generator;
   an electrical propulsion system coupled to said at least one electricity generator such that in operation said at least one electricity generator drives the electrical propulsion system;
   electromechanical protection means arranged between said at least one electricity generator and the electrical propulsion system, each said electromechanical protection means being capable of being in a closed position in which an electrical current is transmitted from the electricity generator to the electrical propulsion system or in an open position in which the transmission of the electrical current from the electricity generator to the electrical propulsion system is interrupted;
   wherein the installation also comprises:
   an electronic computer configured to:
      receive at least one piece of information about a position of the electromechanical protection means;
      receive at least one piece of information about a speed of rotation of a shaft of the internal combustion engine; and
      control a flow of fuel supplying the combustion chamber based on said received pieces of information,
   wherein each said electromechanical protection means comprises at least one auxiliary contact for copying a position of a main cut-off poles of said electromechanical protection means, and wherein the electronic computer is configured to receive at least one piece of information on the position of said at least one auxiliary contact, and
   wherein the hybrid propulsion installation further comprises a solenoid valve arranged between a fuel circuit and the combustion chamber, the solenoid valve being able to be in an-open position in which the combustion chamber is supplied with the fuel or in a closed position in which the supply of the fuel to the combustion chamber is interrupted, and wherein the electronic computer is also configured to control the opening and closing of the solenoid valve.

2. The hybrid propulsion installation according to claim 1, also comprising a device configured to receive at least a first piece of information on the position of the electromechanical protection means and to transmit it to the electronic computer.

3. The hybrid propulsion installation according to claim 2, wherein the device is also configured to generate, from the first piece of information, a second piece of information on the position of the electromechanical protection means and to transmit said second piece of information to the electronic computer.

4. A method for controlling the hybrid propulsion installation of claim 1, comprising the steps of:
   receiving, by the electronic computer, the at least one piece of information on the position of the electromechanical protection means;
   receiving, by the electronic computer, the at least one piece of information on the speed of rotation of the shaft of the internal combustion engine; and
   controlling, by the electronic computer, the flow of the fuel supplying to the combustion chamber according to said received pieces of information.

5. The method according to claim 4, wherein the control step consists in reducing an electric power setpoint of the internal combustion engine when a piece of information on the position of the electromechanical protection means indicates the open position of at least one of the electromechanical protection means.

6. The method according to claim 5, wherein the reduction of the electrical power setpoint, for said at least one electricity generator, is calculated according to the formula:

$$P = Pant/N \quad \text{[Math 5]}$$

where P is the electrical power setpoint of the internal combustion engine, Pant is an anticipatory power of said at least one electricity generator and of the electrical propulsion system before receiving the piece of information on the position of the electromechanical protection means indicating the open position of at least one of the electromechanical protection means, and N is a number of said at least one electricity generator of the hybrid propulsion installation.

7. The method according to claim 5, wherein the reduction of the electrical power setpoint, for said at least one electricity generator, is calculated according to the formula:

$$P = P\_geni \quad \text{[Math 6]}$$

where P is the electrical power setpoint of the internal combustion engine, P_geni is an anticipatory power of the electricity generator i and of at least one part of the electrical propulsion system driven by the electricity generator i, where i is between 1 and N, where N is a number of electrical generators of the hybrid propulsion installation.

8. The hybrid propulsion installation according to claim 1, further comprising a regulation system which comprises a fuel device configured to pump the fuel into a tank of the aircraft and also configured to inject fuel into the combustion chamber.

9. The hybrid propulsion installation according to claim 1, wherein the electromechanical protection means are circuit breakers.

10. The hybrid propulsion installation according to claim 1, wherein the electromechanical protection means are power contactors.

11. An aircraft comprising:
an internal combustion engine comprising at least one combustion chamber;
at least one electricity generator coupled to the internal combustion engine such that in operation the internal combustion engine drives said at least one electricity generator;
an electrical propulsion system coupled to said at least one electricity generator such that in operation said at least one electricity generator drives the electrical propulsion system;
electromechanical protection means arranged between said at least one electricity generator and the electrical propulsion system, each said electromechanical protection means being capable of being in a closed position in which an electrical current is transmitted from the electricity generator to the electrical propulsion system or in an open position in which the transmission of the electrical current from the electricity generator to the electrical propulsion system is interrupted;
wherein the aircraft also comprises: a hybrid installation including an electronic computer configured to:
receive at least one piece of information about a position of the electromechanical protection means;
receive at least one piece of information about a speed of rotation of a shaft of the internal combustion engine; and
control a flow of fuel supplying the combustion chamber based on said received pieces of information,
wherein each said electromechanical protection means comprises at least one auxiliary contact for copying a position of a main cut-off poles of said electromechanical protection means, and wherein the electronic computer is configured to receive at least one piece of information on the position of said at least one auxiliary contact, and
wherein the hybrid propulsion installation further comprises a solenoid valve arranged between a fuel circuit and the combustion chamber, the solenoid valve being able to be in an open position in which the combustion chamber is supplied with the fuel or in a closed position in which the supply of the fuel to the combustion chamber is interrupted, and wherein the electronic computer is also configured to control the opening and closing of the solenoid valve.

* * * * *